Nov. 18, 1947.   T. McINTYRE   2,431,268
QUICK DETACHABLE HOSE COUPLING
Filed June 5, 1946
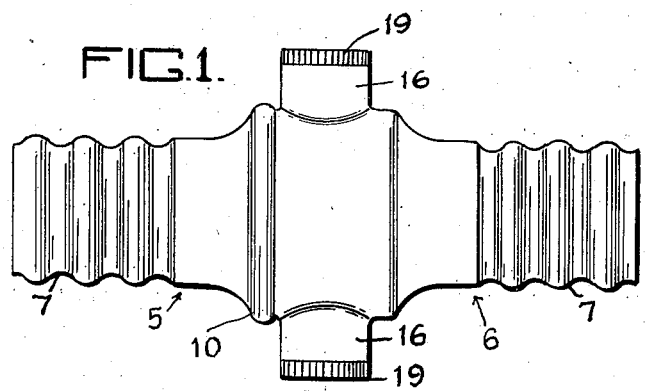
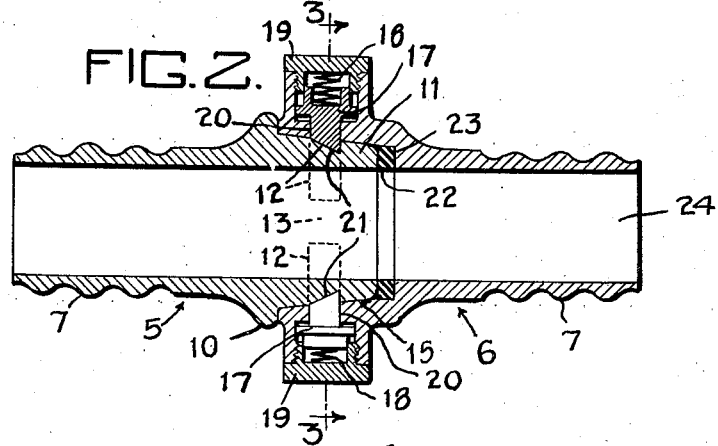
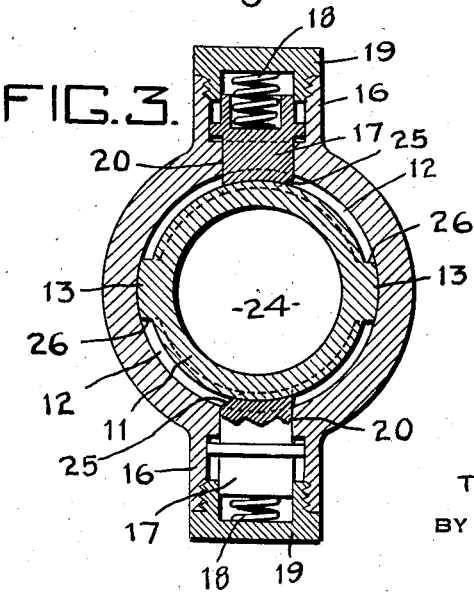
INVENTOR
THOMAS McINTYRE
BY
ATTORNEY Patented Nov. 18, 1947

2,431,268

UNITED STATES PATENT OFFICE 2,431,268

QUICK DETACHABLE HOSE COUPLING

Thomas McIntyre, West New York, N. J.

Application June 5, 1946, Serial No. 674,478

2 Claims. (Cl. 285—169)

The invention relates to a quick detachable hose coupling.

It has for its principal object to provide a hose coupling in which the parts may be connected together or disconnected from each other with the greatest of ease and without the use of any tools or special equipment.

A further object is to provide a coupling which is extremely simple in construction and therefor economical to manufacture and one that is most efficient in operation.

Other objects and advantages will become apparent as this specification proceeds. Referring to the drawings forming a part thereof and in which a preferred form of the invention is illustrated:

Fig. 1 is a side elevation;

Fig. 2 is a longitudinal sectional view, parts being in elevation; and

Fig. 3 is a cross-sectional view on a somewhat larger scale, parts being in elevation, and is taken on line 3—3 of Fig. 2.

Referring again to the drawings the reference numeral 5 designates the male half of the coupling and 6 the female half. Both halves are provided with the usual undulations or grooves 7 to facilitate the securing of the hose thereto. Obviously other means than that illustrated might be utilized for securing the hose to the parts of the coupling.

The male half of the coupling is somewhat enlarged at its operating end so as to form a flange 10 and a tapered nose 11. The intermediate portion of the outer surface of the nose 11 is provided with an annular groove 12 the bottom wall of which is angularly disposed in relation to the surface of the nose and this groove has two or more interrupted portions 13 which are flush with the outer surface of the nose.

The operating end of the female half of the coupling is enlarged and a tapered socket 15 is formed in this enlargement, the taper of the socket 15 substantially coinciding with the taper of the nose 11. The female half of the coupling has a pair of oppositely disposed bosses 16. In large size couplings more than two such bosses might be employed.

Each of the bosses 16 accommodates a latching member 17 which when the coupling is connected engage the annular groove 12 in the nose 11 of the male member. The latching members 17 are slidably mounted in the bosses 16 and are normally urged toward the groove 12 by springs 18 which are confined between the latching member and caps 19 having screw threaded engagement with the open ends of the bosses.

The latching members pass through openings 20 in the enlarged portion of the female half of the coupling and their inner or lower faces are slabbed off as indicated at 21 to conform to the configuration of the groove 12. It is thought to be evident particularly from an inspection of Fig. 2 that the latching members 17 in cooperation with the groove 12 will firmly and positively hold the two halves of the coupling together. The angularity of the bottom of the groove 12 in conjunction with the slabbed off inner ends of the spring pressed latching members tends to force the end of the nose 11 against a packing gasket 22 positioned against a shoulder 23 in the female half of the coupling to insure a water-tight connection. It will also be noted from an inspection of Fig. 2 that the construction of the coupling provides an unrestricted opening 24 for the free flow and passage of liquid through the coupling.

As indicated at 25 in Fig. 3 one of the corners at the inner ends of the locking members is chamfered off. When the female half of the coupling is turned in a counter-clockwise direction in relation to the male member in Fig. 3 the chamfered off regions 25 will engage shoulders 26 formed at the ends of the groove 12 and the latching members 17 will be cammed onto the high spots 13 formed by the interrupted portions of the groove 12 and the two halves of the coupling may be easily and quickly separated. If desired, both inner corners of the latching members might be chamfered off. Thus turning the two halves of the coupling in relation to each other in either direction would effect a separation. Obviously when the two halves of the coupling are separated the springs 18 will push the latching members 17 inwardly. When it is desired to connect the coupling again immediately upon the male half being entered into the female half the outer tapered surface of the male half will cause the latching members to be retracted and they will remain in their retracted positions until the groove 12 is directly under them at which time the springs 18 will force the locking members 17 into the groove to complete the connection between the two halves.

It is thought from the foregoing that an exceedingly simple and efficient coupling has been provided. Only a slight turn and pull will disconnect the coupling and only a push and maybe a slight turn, depending upon the position of the locking members in relation to the groove, will effect a connection. As far as applicant is aware in operating couplings of this nature it has been necessary to use a special tool or a wrench or screw driver, thus making it almost a two man job on heavy hose such as fire hose. With the coupling of the present invention one man may connect or disconnect it with ease and celerity and this is quite important particularly in connection with fire hose.

Such changes in details of construction as would occur to one skilled in the art are to be considered as coming within the spirit of the invention as set forth in the appended claims.

I claim:

1. A quick detachable hose coupling having in combination, a male member, a tapered nose on one end of said male member, an annular groove on the exposed surface of said tapered nose, a plurality of interrupted portions in said annular groove, a female member, a tapered socket in said female member to accommodate said tapered nose, bosses carried by said female member, latching members slidably mounted in said bosses, springs urging said latching members into engagement with said annular groove when said male and female members are connected together and chamfered off corners on the inner ends of said latching members so that when said male and female members are rotated in relation to each other said chamfered off corners will engage shoulders formed by the interrupted regions of said annular groove and cause said latching members to be retracted from said groove.

2. A quick detachable hose coupling having in combination, a male member, a tapered nose on one end of said male member, an annular groove on the exposed surface of said tapered nose, the bottom of said annular groove being angularly disposed in relation to the surface of said tapered member, a plurality of interrupted portions in said annular groove, a female member, a tapered socket in said female member to accommodate said tapered nose, bosses carried by said female member, latching members slidably mounted in said bosses, caps having screw threaded engagement with the open ends of said bosses, springs confined between said caps and said latching members to urge said latching members into engagement with said annular groove when said male and female members are connected together, slabbed off inner ends on said latching members to conform to the shape of said annular groove, and chamfered off corners on the inner ends of said latching members so that when said male and female members are rotated in relation to each other said chamfered off corners will engage shoulders formed by the interrupted regions of said annular groove and cause said latching members to be retracted from said groove.

THOMAS McINTYRE.

REFERENCES CITED

The following references are of record in the file of this patent:

UNITED STATES PATENTS

| Number | Name | Date |
|---|---|---|
| 1,098,752 | Olson | June 2, 1914 |

FOREIGN PATENTS

| Number | Country | Date |
|---|---|---|
| 406,120 | Great Britain | Feb. 22, 1934 |